Oct. 6, 1964    W. LITA ETAL    3,151,563
SPRAYING ATTACHMENT FOR LAWN MOWER
Filed Dec. 5, 1963    2 Sheets-Sheet 1

INVENTORS
William Lita &
Donald Werba

BY *Clive H. Bramson*

ATTORNEY

United States Patent Office 3,151,563
Patented Oct. 6, 1964

3,151,563
SPRAYING ATTACHMENT FOR LAWN MOWER
William Lita, 91 Kime Ave., and Donald Werba, 290 Neptune Ave., both of North Babylon, N.Y.
Filed Dec. 5, 1963, Ser. No. 328,402
5 Claims. (Cl. 103—54)

This invention relates generally to liquid-spraying pumps and more particularly to an accessory of such character cooperatively associated with means adapted to harness the power of rotary lawn mowers to the ends of spraying fertilizer, insecticide, weed killer or the like upon lawns, trees or garden areas. Spraying other non-cognate liquids, as well, such as paints, will be capable of accomplishment through the efficacy of the present invention.

As is well known, lawn mowers have, heretofore, been utilized for the purpose of driving compressors, pumps and other like fluid impelling mechanisms, such auxiliary attachments, however, having been mounted directly upon the mower. The attendant primary disadvantage of such prior practice resides obviously in the additional burden required to be propelled notwithstanding that most frequently the mower is to be used only for its intended grass-cutting function. Further, the initial cost of such mowers would of necessity be substantially greater than the cost of mowers exclusive of such inherently provided mechanisms.

Consonant with the foregoing, an instrumentality is herewith provided, which, by virtue of the absence of complexity of its construction and secondly by reason of its applicability as a unit apart from the conventional mower itself but nevertheless readily useful in conjunction therewith, has obviated the aforestated disadvantages of the mower-compressor combination afore-known to the prior art.

Consequently, the primary object of the instant invention is to provide a liquid-spraying apparatus independent of the mower itself to thus obviate the burden of pushing non-functional weight during the grass-cutting operation.

Another important object of the present invention resides in the provision of a liquid-spraying attachment which may be conveniently used by lawn mower owners in cases where the lawn mower, as originally purchased, lacked any mechanism inherent therewith, which would enable the mower to be used for liquid-spraying purposes.

Another object of the invention resides in the provision of a liquid-spraying attachment adapted to harness the power of a lawn mower of the type having a cutting member disposed for rotation in a plane parallel with respect to the base of said mower.

A further object of the invention is to provide a spraying attachment for rotary lawn mowers whereby the rotary cutting member thereof is removably engageable with said attachment notwithstanding the absence of any direct connection therebetween.

Another object of the instant invention resides in the provision of a liquid-spraying attachment capable of utilization with rotary lawn mowers of various brands and dimensions.

Another object of the invention is to provide an attachment of the foregoing character which may be adapted to be driven by rotary lawn mowers having varying cutting member configurations.

Another general object of the present invention is to provide a device of the described character which will be simple in structure, economical of manufacture, easily and quickly adapted to a conventional rotary lawn mower and highly effective in use.

Other objects and advantages of the instant spraying attachment for lawn mowers will be set forth in part hereinafter and in part will be obvious herefrom, or may be learned by practice of the invention, the same being realized and attained by means of the structure defined and pointed out in the appended claims.

The invention consists in the novel parts, constructions, arrangements, combinations and improvements herein shown and described. The accompanying drawings referred to herein and constituting a part hereof, illustrate one embodiment of the invention, and together with the description, serve to explain the principles of the invention.

Figure 1:
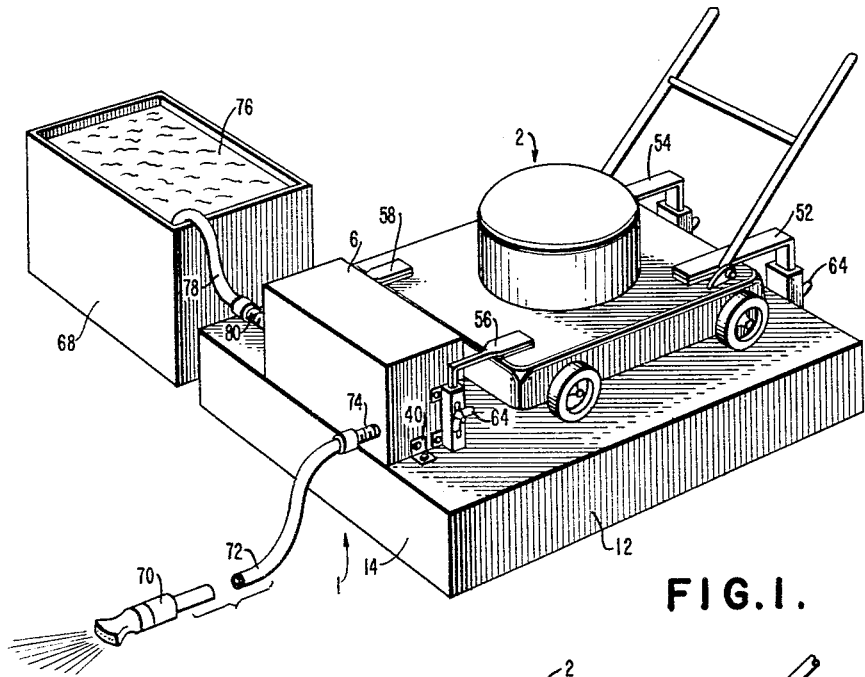
FIGURE 1 is a perspective view of the spraying apparatus in accordance with the present invention, a rotary lawn mower being operatively mounted thereon.
Figure 2:
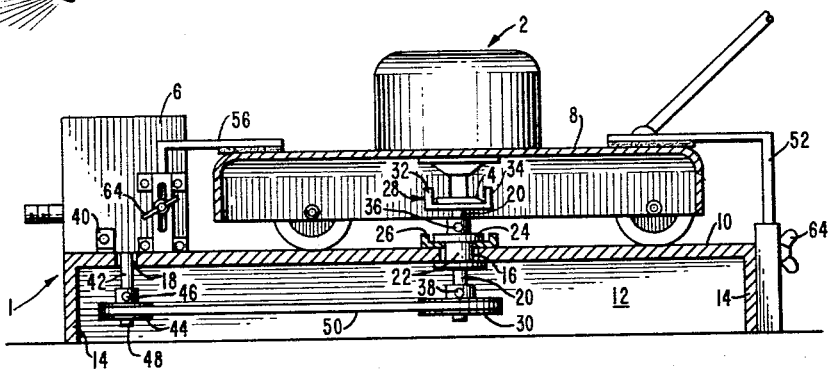
FIGURE 2 is a fragmentary, side elevational view of the apparatus and mower shown in FIGURE 1, a portion of the mower carriage being broken away and shown in cross-section for clarity of illustration.

Referring now in detail to the present preferred embodiment of the invention illustrated in the accompanying drawings, FIGURES 1 and 2 show the spraying apparatus designated generally by numeral 1 and a conventional rotary lawn mower designated generally by numeral 2, operatively associated in a manner whereby rotation of cutting member 4 of the mower is harnessed to motivate liquid-spraying pump 6, said cutting member being rotatable in a plane parallel to base 8 of the mower.

More specifically, it will be seen, the apparatus is preferably comprised of a platform structure having substantially flat upper or top surface 10, side walls 12 and end walls 14, said surface being provided with first and second openings 16 and 18, respectively, therethrough.

As illustrated, shaft 20, vertically disposed within said opening 16, is rotatably supported therein by mandrel bearing 22, shoulder 24 of said mandrel being rotatably seated within annular collar 26. It will be further observed that cutting member engaging means 28 is connected to the end of said shaft extending above said top surface 10, pulley wheel 30 being connected to the other end of said shaft extending below said top surface. Inasmuch as the rotary blades or cutting members of various types of lawn mowers depend varying distances with respect to the bases 8 thereof and are formed of various widths, the instant U-shaped cutting member engaging means 28 is constructed in such manner whereby the upright members 32, 34 thereof, will extend upwardly sufficiently to engage blades depending over a substantial range of distances; said upright members being also spaced sufficiently in order to receive cutting members notwithstanding the varying range in widths thereof. It will be appreciated that although the envelopment of members 32 and 34 about cutting member 4 may be loose thus permitting a substantial margin of movement therebetween, further movement will be precluded once the cutting member commences its rotation, contiguity between the upright members and the cutting member being then effectuated. To afford further adjustment, if necessary, in achieving registry between members 28 and 4, the height of shaft 20 may be regulated by loosening Allen-head set-screw 36 to accomplish such adjustment, whereafter set-screw 38 may be loosened to properly reposition said pulley wheel 30.

Liquid-spraying pump 6, as shown, is mounted upon the flat surface 10, angle brackets 40 being utilized for effectuating securement of said pump and said platform structure. The usual power-input-shaft 42 extending outwardly of said pump depends vertically therefrom and is disposed through said opening 18 provided through the surface of said platform structure. Pulley wheel 44 is secured by means of set-screw 46 to the free end 48 of said input-shaft, continuous belt 50 being provided to drivingly connect said pulley wheels 30 and 44 to thus occasion the transmission of power from the cutting member of the rotary lawn mower 2, to the liquid-spraying pump 6, said cutting member engaging means, shafts, pulleys, and belt being the intermediate instrumentalities provided in the instant power harnessing arrangement.

Figure 5:
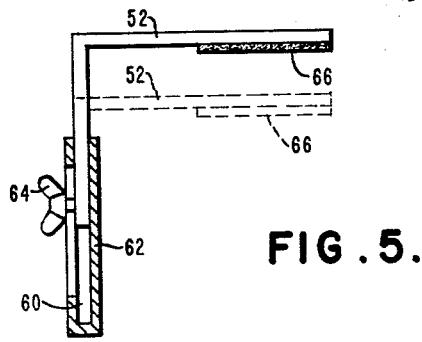
FIGURE 5 is a detailed cross-sectional view of the means preferably utilized in securing the mower to the spraying attachment.
Figure 3:
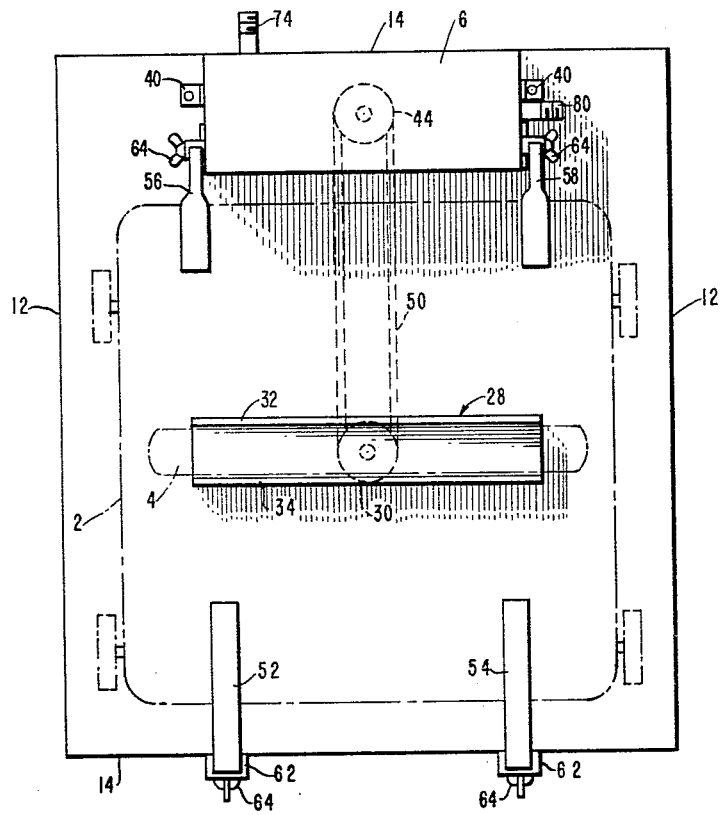
FIGURE 3 is a partial plan view of the arrangement shown in FIGURE 1, the mower itself, however, being designated in broken outline.
Figure 4:
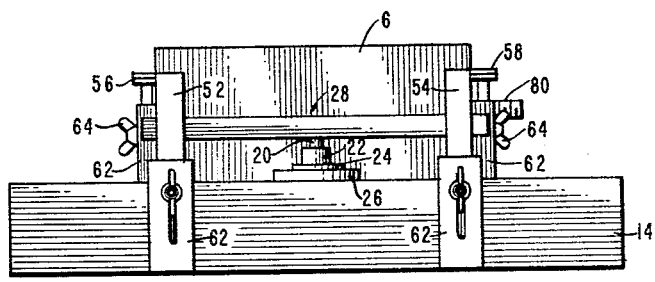
FIGURE 4 is an end view elevation of the apparatus apart from the mower.

To the end of securing a power providing lawn mower to the platform structure to thereby retain the cutting member and cutting member engaging means in driving engagement, pairs of vertically adjustable L-shaped arms 52, 54, and 56, 58 are, as illustrated in the drawings, provided. With reference to FIGURE 5, it will be observed that the typical preferred fastening means 52 shown therein includes vertical and horizontal portions, the former of which is slidably received within passage 60 of sleeve 62, wing-headed screw 64 being provided to permit manual adjustment of the vertical disposition of said arm. Cushion material 66, e.g., rubber, felt, plastic or other suitable material, which is cemented to the bottom surface of the horizontal portion, functions to preclude damage to the finish of the lawn mower and to minimize surface-to-surface vibrational sounds during the operation of the instant attachment.

It will be appreciated that although said fastening means secured to both said platform structure and said liquid-spraying pump serve primarily to preclude vertical displacement of the lawn mower, lateral displacement thereof is additionally precluded by dint of the retention of said cutting member within said cutting member engaging means during the mutual rotation thereof.

Accordingly, then, the instant apparatus, when powered by the rotary cutting member of a lawn mower as aforedescribed, may be utilized to the end of pumping any liquid, e.g., insecticide, weed killer, paint, etc., as contained in receptacle 68 as illustrated in FIGURE 1 of the drawings, in the form of a spray emitted from nozzle 70, the latter being connected through hose conduit 72 to pump-outlet fitting 74. The selected liquid 76 contained within said receptacle 68 is, as shown, siphoned by pump action into the latter through conduit-section 78, said conduit-section being connected at one end to pump-inlet fitting 80.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

What is claimed is:
1. A liquid-spraying attachment adapted to harness the power of a lawn mower having a rotary cutting member, comprising, a platform structure having a top surface, side and end walls, said top surface having first and second openings therethrough, a vertically disposed shaft rotatably mounted within said first opening, one end of said shaft extending above said top surface, the other end of said shaft extending below said top surface, cutting member engaging means connected to said one end of said shaft and a first pulley wheel connected to said other end thereof, a liquid-spraying-pump mounted upon said top surface, a power-input-shaft extending outwardly of said pump, the free end of said input-shaft being vertically disposed through said second opening, a second pulley wheel connected to the free end of said input-shaft, a continuous belt drivingly connecting said first and second pulley wheels, and fastening means adapted to secure said lawn mower to said platform structure, whereby the cutting member and cutting member engaging means are retained in driving engagement.

2. A liquid-spraying attachment as set forth in claim 1 wherein said cutting member engaging means is comprised of a U-shaped portion adapted to removably receive the rotary cutting member of the lawn mower.

3. A liquid-spraying attachment as set forth in claim 1 wherein said fastening means comprises L-shaped arms, said arms being secured to said platform structure and vertically adjustable with respect thereto.

4. A liquid-spraying attachment as set forth in claim 1 wherein said fastening means comprises L-shaped arms, said arms being secured to said liquid-spraying-pump, and vertically adjustable with respect thereto.

5. A liquid-spraying attachment adapted to harness the power of a lawn mower having a rotary cutting member, said cutting member being rotatable in a plane parallel to the base of said mower, comprising in combination, a platform structure having a substantially flat upper surface, said surface being provided with first and second openings therethrough, a vertically disposed shaft rotatably mounted within said first opening, one end of said shaft extending above said upper surface, the other end of said shaft extending below said upper surface, cutting member engaging means connected to said one end of said shaft and a first pulley wheel connected to said other end thereof, a liquid-spraying-pump mounted upon said upper surface, a power-input-shaft extending outwardly of said pump, the free end of said input-shaft being vertically disposed through said second opening, a second pulley wheel connected to the free end of said input-shaft, a continuous belt drivingly connecting said first and second pulley wheels, and fastening means adapted to secure said lawn mower to said platform structure whereby the cutting member and cutting member engaging means are retained in driving engagement.

References Cited in the file of this patent
UNITED STATES PATENTS

| 2,737,340 | Bonini | Mar. 6, 1956 |
| 2,799,446 | Meyer | July 16, 1957 |
| 2,930,068 | Evanson et al. | Mar. 29, 1960 |